United States Patent
Chon et al.

(10) Patent No.: US 11,714,596 B2
(45) Date of Patent: Aug. 1, 2023

(54) AUDIO SIGNAL PROCESSING METHOD AND APPARATUS

(71) Applicant: GAUDIO LAB, INC., Seoul (KR)

(72) Inventors: Sangbae Chon, Seoul (KR); Soochul Park, Seoul (KR)

(73) Assignee: GAUDIO LAB, INC., Seoul (KR)

( * ) Notice: Subject to any disclaimer, the term of this patent is extended or adjusted under 35 U.S.C. 154(b) by 97 days.

(21) Appl. No.: 17/506,678

(22) Filed: Oct. 21, 2021

(65) Prior Publication Data

US 2022/0129237 A1      Apr. 28, 2022

Related U.S. Application Data

(60) Provisional application No. 63/118,979, filed on Nov. 30, 2020.

(30) Foreign Application Priority Data

Oct. 22, 2020 (KR) .................. 10-2020-0137269

(51) Int. Cl.

| | | |
|---|---|---|
| *G10L 25/30* | (2013.01) | |
| *G06N 3/08* | (2023.01) | |
| *G06F 3/16* | (2006.01) | |
| *H04R 3/00* | (2006.01) | |
| *H04S 7/00* | (2006.01) | |

(52) U.S. Cl.
CPC .............. *G06F 3/165* (2013.01); *H04R 3/00* (2013.01); *H04S 7/30* (2013.01); *H04R 2430/01* (2013.01)

(58) Field of Classification Search
CPC ....... G10L 21/0272; G10L 25/30; G06N 3/08; G06F 3/165; H04R 3/00; H04R 2430/01; H04S 7/30
See application file for complete search history.

(56) References Cited

U.S. PATENT DOCUMENTS 10,686,420 B2 *  6/2020  Park ..................... H04R 3/00
10,930,299 B2 *  2/2021  Lu ..................... G10L 21/0272
(Continued)

FOREIGN PATENT DOCUMENTS

| KR | 10-1807961 | 12/2017 |
|---|---|---|
| KR | 10-2019-0125078 | 11/2019 |

(Continued)

OTHER PUBLICATIONS

International Search Report for PCT/KR2021/014764 dated Feb. 10, 2022 and its English machine translation provided by Applicant's foreign counsel.

(Continued)

*Primary Examiner* — David L Ton
(74) *Attorney, Agent, or Firm* — Ladas & Parry, LLP

(57) ABSTRACT

Disclosed is an operation method of an audio signal processing device configured to process an audio signal including a first audio signal component and a second audio signal component. The operation method includes: receiving the audio signal; normalizing loudness of the audio signal, based on a pre-designated target loudness; acquiring the first audio signal component from the audio signal having the normalized loudness, by using a machine learning model; and de-normalizing loudness of the first audio signal component, based on the pre-designated target loudness.

15 Claims, 7 Drawing Sheets

(56) References Cited

U.S. PATENT DOCUMENTS

| | | | | |
|---|---|---|---|---|
| 2015/0235125 A1* | 8/2015 | Krishnan | ............... | G06N 3/049 706/22 |
| 2019/0334497 A1 | 10/2019 | Wang et al. | | |
| 2020/0162048 A1* | 5/2020 | Cremer | .................... | H04N 5/60 |
| 2022/0028407 A1* | 1/2022 | Bai | .......................... | G10H 1/36 |
| 2022/0406325 A1* | 12/2022 | Kitamura | .............. | G10L 21/028 |

FOREIGN PATENT DOCUMENTS

| | | |
|---|---|---|
| KR | 10-2020-0032935 | 3/2020 |
| KR | 10-2020-0109958 | 9/2020 |
| WO | WO-2022043906 A1 * | 3/2022 |
| WO | WO-2022150286 A1 * | 7/2022 |

OTHER PUBLICATIONS

Written Opinion of the International Searching Authority for PCT/KR2021/014764 dated Feb. 10, 2022 and its English machine translation provided by Applicant's foreign counsel.

\* cited by examiner

AUDIO SIGNAL PROCESSING METHOD AND APPARATUS

BACKGROUND OF THE INVENTION

1. Field of the invention

The present invention relates to a method and a device for processing an audio signal including multiple signal components by using a machine learning model.

2. Description of the Prior Art

Recently, with development of deep neural network technology, various machine learning models have been used in the audio signal processing field. The machine learning models have been also actively introduced to a sound source separation technology, wherein sound source separation has been a popular subject in the audio signal processing field for a long time. In addition, the sound source separation technology has been used for various uses such as separation of a voice of a singer from background instruments for a karaoke function of a sound source streaming service or filtering out ambient noise and a speaker's voice in a contactless meeting service. For these reasons, a sound source separation technology using various machine learning models has been attempted. To enhance performance of sound source separation, there is a need for a method for preprocessing an audio signal for a sound source separation machine learning model and a machine learning model optimized for sound source separation.

SUMMARY OF THE INVENTION

An embodiment of the present invention is to provide a method and a device for processing an audio signal including multiple signal components, by using a machine learning model.

According to an embodiment of the present invention, an operation method of an audio signal processing device which operates in at least one process and is configured to process an audio signal including a first audio signal component and a second audio signal component includes: receiving the audio signal; normalizing loudness of the audio signal, based on a pre-designated target loudness; acquiring the first audio signal component from the audio signal having the normalized loudness, by using a machine learning model; and de-normalizing loudness of the first audio signal component, based on the pre-designated target loudness.

At least one of the first audio signal component and the second audio signal component may be an audio signal component corresponding to a voice.

The normalizing of the loudness of the audio signal, based on the pre-designated target loudness, may include normalizing loudness in units of contents included in the audio signal.

The machine learning model may process the audio signal having the normalized loudness in a frequency area.

The normalizing of the loudness of the audio signal, based on the pre-designated target loudness, may include: dividing the audio signal into multiple pre-designated time intervals, dividing loudness values in the multiple pre-designated time intervals into multiple levels, and acquiring loudness of the audio signal by using a loudness value distribution for each of the multiple levels; and normalizing the loudness of the audio signal to target loudness.

The machine learning model may include gate logic.

The acquiring of the first audio signal component from the audio signal having the normalized loudness, by using the machine learning model, may include classifying a frequency bin-specific score acquired from the machine learning model, based on a pre-designated threshold value. The score may indicate a degree of closeness to the first audio signal component.

According to an embodiment of the present invention, a method for training a machine learning model which operates in at least one process and is configured to classify a first audio signal component from an audio signal including the first audio signal component and a second audio signal acquired from different sources includes: receiving the audio signal; normalizing loudness of the audio signal, based on pre-designated target loudness; acquiring a first audio signal component from the audio signal having the normalized loudness, by using the machine learning model; and restoring the loudness of the first audio signal component, based on the pre-designated target loudness.

At least one of the first audio signal component and the second audio signal component may be an audio signal component corresponding to a voice.

The normalizing of the loudness of the audio signal, based on the pre-designated target loudness, may include normalizing loudness in units of contents included in the audio signal.

The machine learning model may process the audio signal having the normalized loudness in a frequency area.

The normalizing of the loudness of the audio signal, based on the pre-designated target loudness, may include: dividing the audio signal into multiple pre-designated time intervals, dividing loudness values in the multiple pre-designated time intervals into multiple levels, and acquiring loudness of the audio signal by using a loudness value distribution for each of the multiple levels; and normalizing the loudness of the audio signal to target loudness.

The machine learning model may include gate logic.

The acquiring of the first audio signal component from the audio signal having the normalized loudness, by using the machine learning model, may include classifying a frequency bin-specific score acquired from the machine learning model, based on a pre-designated threshold value. The score may indicate a degree of closeness to the first audio signal component.

According to an embodiment of the present invention, an audio signal processing device configured to process an audio signal including a first audio signal component and a second audio signal component includes at least one processor. The at least one processor may receive the audio signal, normalize loudness of the audio signal, based on a pre-designated target loudness, acquire the first audio signal component from the audio signal having the normalized loudness, by using a machine learning model, and de-normalize loudness of the first audio signal component, based on the pre-designated target loudness.

A device and a method according to an embodiment of the present invention may provide a device and a method for processing an audio signal including multiple signal components by using a machine learning model.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EXEMPLARY EMBODIMENTS

Figure 1:
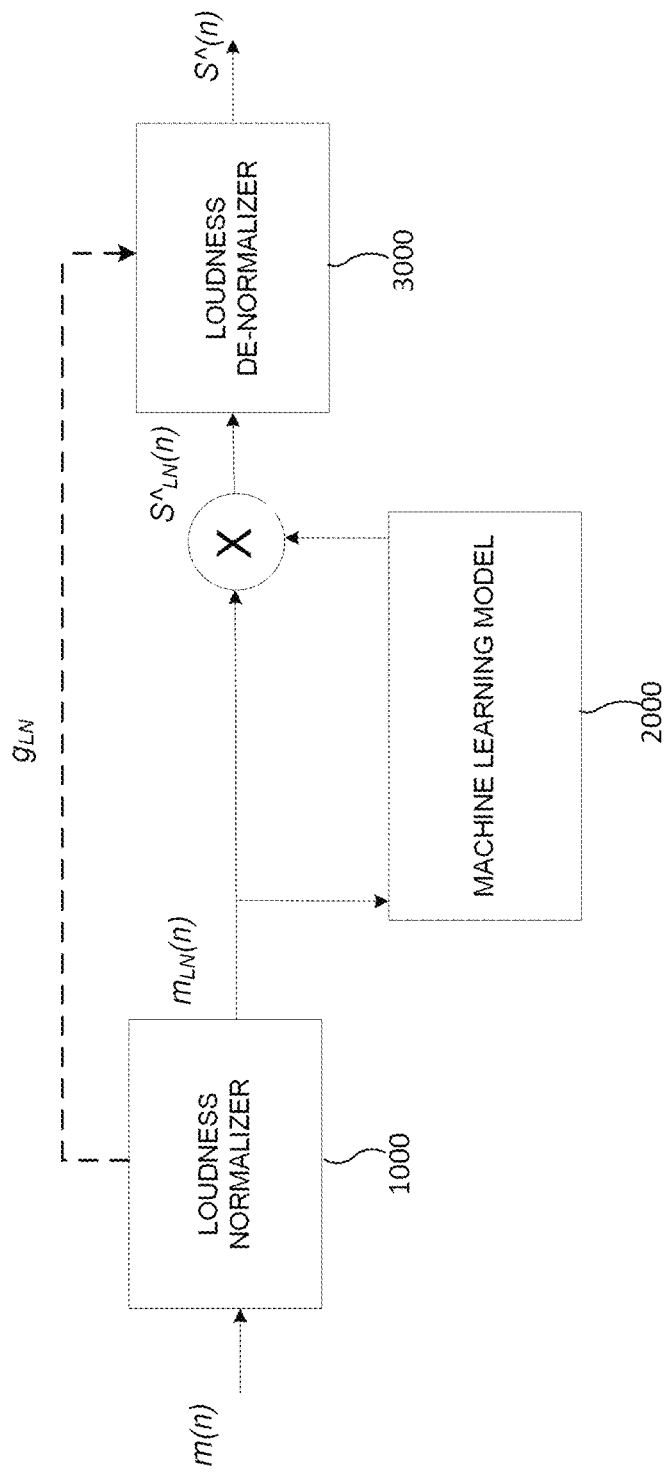
FIG. 1 is a block diagram illustrating a process of processing an audio signal by an audio signal processing device according to an embodiment of the present invention.

Hereinafter, embodiments of the present invention will be described in detail with reference to the accompanying drawings so that the embodiments of the present invention can be easily carried out by those skilled in the art. However, the present invention may be implemented in many different forms and is not limited to the embodiments described herein. Illustration of some parts of the embodiments, which are not related to the description, is omitted in the drawings to clearly describe the embodiments of the present invention, and like reference numerals refer to like elements throughout the description. When it is mentioned that a certain part "includes" or "comprises" certain elements, it may mean, unless otherwise specified, that the part may further include other elements, rather than excluding the other elements.

An audio signal processing device according to an embodiment of the present invention includes at least one processor. An audio signal processing operation described in the present invention may be an operation of an instruction set operating in a processor included in the audio signal processing device.

A content includes various sources of audio signal components, and loudness corresponding to a perceptional scale of each audio signal component changes in various ways. For example, an audio signal component in each source of a song is played or vocalized in pianissimo to fortissimo for musical expression. In this case, a machine learning model performing sound source separation generalizes attributes of the audio signal component, which makes it difficult to perform determination. Accordingly, before sound source separation, a scale of loudness of an audio signal may be normalized. The machine learning model can more accurately recognize the attributes of each audio signal component through the loudness normalization. Accordingly, when the scale of the loudness of the audio signal is normalized, sound source separation performance can be enhanced. In addition, mixing of contents is performed based on an acoustic attribute rather than a physical scale of a signal, and thus, loudness is to be normalized instead of the physical scale of the audio signal, so as to maintain a ratio between various audio signal components similar to an input audio signal. Accordingly, for enhancement of sound source separation performance, it may be more efficient to normalize the loudness instead of the physical scale of the audio signal. The audio signal processing device may normalize the loudness of the audio signal to target loudness, and apply a machine learning model for sound source separation to the audio signal having the normalized loudness. This will be also described with reference to FIG. 1. In the specification, loudness may indicate a scale of an acoustically perceived sound. The level of the loudness may correspond to a numerical number indicating the loudness. For example, the level of the loudness may be indicated using a unit such as loudness K-weighted relative to full scale (LKFS) or loudness unit relative to full scale (LUFS). In addition, the level of the loudness may be indicated using a unit such as sone or phon. In addition, the level of the loudness may be expressed in a numerical value utilizing a scale of a signal for which cognitive model filtering is performed, wherein human acoustic attributes are reflected to the cognitive model filtering. In this case, the cognitive model filtering may include at least one of A/B/C/D-weighting.

Figure 2:
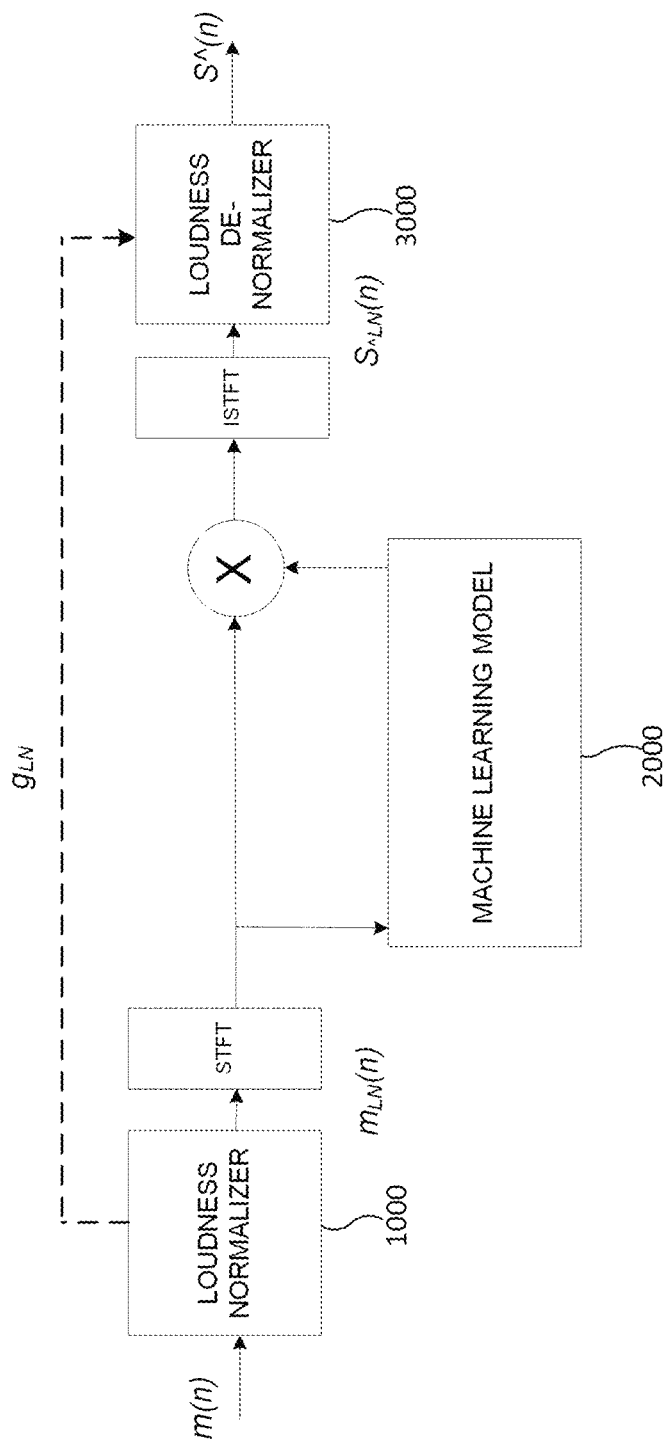
FIG. 2 is a block diagram illustrating a process of processing an audio signal in a frequency domain by an audio signal processing device according to an embodiment of the present invention.

FIGS. 1 and 2 are block diagrams illustrating a process of processing an audio signal by an audio signal processing device according to an embodiment of the present invention.

An audio device processing device may include a loudness normalizer 1000, a machine learning model 2000, and a loudness de-normalizer 3000.

The loudness normalizer 1000 normalizes loudness of an input audio signal (m(n)) to target loudness, and then inputs an audio signal ($m_{LN}(n)$) having the normalized loudness to a machine learning model. The machine learning model 2000 outputs, from the audio signal having the normalized loudness, a first signal component ($\hat{S}_{LN}(n)$) having the normalized loudness. The loudness de-normalizer 3000 may de-normalize the first signal component ($\hat{S}_{LN}(n)$) having the normalized loudness, based on the target loudness, and acquire the first signal component ($\hat{S}_{LN}(n)$). Specifically, the loudness de-normalizer 3000 may acquire a gain ($g_{LN}$) used for loudness de-normalization, based on the target loudness and the input audio signal. Specifically, the gain used for the de-normalization may be acquired according to an equation below, $$g_{LN} = 10^{(L_T - L_I)/20},$$

wherein $g_{LN}$ indicates a gain used for the loudness de-normalization, $L_T$ indicates target loudness, and $L_I$ indicates integrated loudness of the input audio signal.

The loudness de-normalizer 3000 may de-normalize the first signal component ($\hat{S}_{LN}(n)$) which has the normalized loudness and is output from the machine learning model 2000, by using the acquired gain, and acquire the first signal component ($\hat{S}_{LN}(n)$).

In addition, the loudness de-normalizer 3000 may de-normalize the loudness of the audio signal by using loudness distribution information used for the loudness normalization.

In the above-described operation, the target loudness may be determined according to a content of the input audio signal (m(n)). This is because a ratio of an audio signal component subject to sound source separation to the remaining signal components may vary for each content. When normalizing the loudness of the input audio signal to the loudness of the audio signal component subject to the separation, the audio signal processing device can increase sound source separation performance. The audio signal processing device cannot determine the loudness of the audio signal component subject to the separation, and thus the audio signal processing device may predict a ratio of the audio signal component subject to separation among the input audio signal, and determine target loudness, based on the predicted ratio. In this case, the predicted ratio may have a value pre-designated for each content component. For example, a scale of target loudness to be applied when a content of the input audio signal (m(n)) corresponds to a movie may be smaller than a scale of target loudness to be applied when a content of the input audio signal (m(n)) corresponds to music. In addition, a scale of target loudness to be applied when a content of the input audio signal (m(n)) corresponds to rock music may be larger than a scale of target loudness to be applied when a content of the input audio signal (m(n)) corresponds to classical music. In another specific embodiment, the target loudness may be an average of loudness values of the input audio signal. Specifically, the target loudness may be an average of loudness values of the input audio signal.

In addition, the loudness normalizer 1000 may normalize the scale of the loudness of the input audio signal in units of contents included in the input audio signal. For example, when the input audio signal includes music, the loudness normalizer 1000 may normalize the scale of the loudness of the input audio signal in units of songs. This is because loudness is configured in units of contents when performing an audio mixing operation and the loudness is maintained according to the regulation of each region in a case of a specific content. For example, in a case of TV broadcasting, it is regulated that −23 to −25 LKFS is to be maintained.

In addition, the loudness normalizer 1000 may normalize the loudness of the input audio signal, based on loudness for each time interval of the input audio device. In a specific embodiment, the loudness normalizer 1000 may determine target loudness by adding a pre-designated scale to integrated loudness of the corresponding time interval. In the embodiments, the input audio signal may be an audio signal generated in real time. For example, the input audio signal may be an audio signal for a video call, and live streaming. This is because the loudness of each audio signal component of the audio signal generated in real time may not be maintained constant. In addition, when the input audio signal includes a voice, the loudness normalizer 1000 may classify an input audio signal interval according to a speaker, and normalize the loudness for each audio signal interval classified according to the speaker. For example, when there is an interval X in which a speaker A speaks and an interval Y in which a speaker B speaks, the loudness normalizer 1000 may normalize the loudness of the interval X and the loudness of the interval Y independently from each other.

In addition, the loudness normalizer 1000 may normalize the loudness of the input audio signal (m(n)) by using a loudness histogram. In this case, the input audio signal (m(n)) is divided into multiple pre-designated time intervals, and loudness values of the multiple pre-designated time intervals are divided into multiple levels. The loudness histogram indicates a distribution of loudness values for each of the multiple levels.

In addition, the input audio signal (m(n)) may include a signal component corresponding to a voice. In this case, the machine learning model 2000 may acquire a signal component corresponding to the voice from the audio signal ($m_{LN}(n)$) having the normalized loudness. For example, the machine learning model 2000 may output the signal component corresponding to the voice from an audio signal including a signal component corresponding to an ambient sound and the signal component corresponding to the voice. In another specific embodiment, the machine learning model 2000 may output a signal component corresponding to background instruments from an audio signal including a signal component corresponding to singing of a singer and the signal component corresponding to background instruments.

In addition, the machine learning model 2000 may process the audio device ($m_{LN}(n)$) having the normalized loudness in a frequency area. To this end, the audio signal processing device may apply a Fourier transform to the audio signal ($m_{LN}(n)$) having the normalized loudness, and apply an inverse Fourier transform to the acquired audio signal ($m_{LN}(n)$) having the normalized loudness. In this case, the Fourier transform and the inverse Fourier transform may be a short time Fourier transform and a short time inverse Fourier transform, respectively.

The machine learning model 2000 may be optimized for sound source separation. This will be described with reference to FIG. 3.

Figure 3:
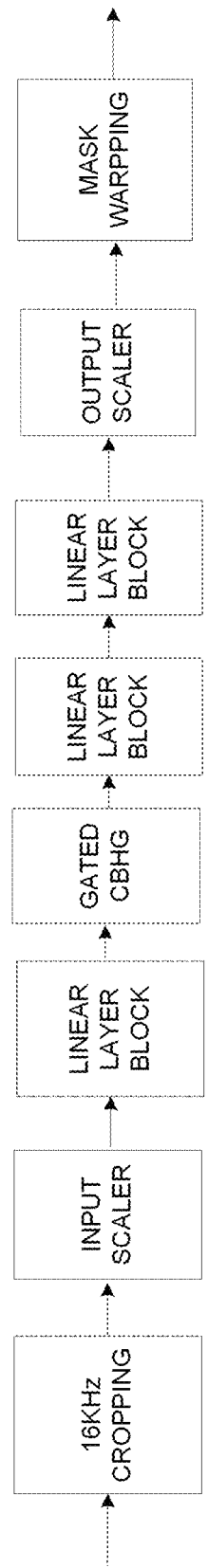
FIG. 3 illustrates a machine learning model used by an audio signal processing device according to an embodiment of the present invention.

FIG. 3 illustrates a machine learning model used by an audio signal processing device according to an embodiment of the present invention.

A machine learning model of an audio signal processing device according to an embodiment of the present invention may include gate logic. This is because the gate logic is appropriate for attribute extraction and activation detection of an audio signal. Specifically, the machine learning model may correspond to a long short-term memory (LSTM)-based machine learning model including gate logic. In another specific embodiment, the machine learning model may correspond to a gated recurrent unit (GRU)-based machine learning model. This is because the attribute of the audio signal is shown in a predetermined time interval or later. Specifically, the machine learning model may be gate convolutional 1-D filters, bank, highway networks, gated recurrent unit bidirectional (CBHG).

The machine learning model 2000 may include 16 KHz cropping, an input scaler, a three linear layer block, CBHG, and an output scaler.

Figure 4:
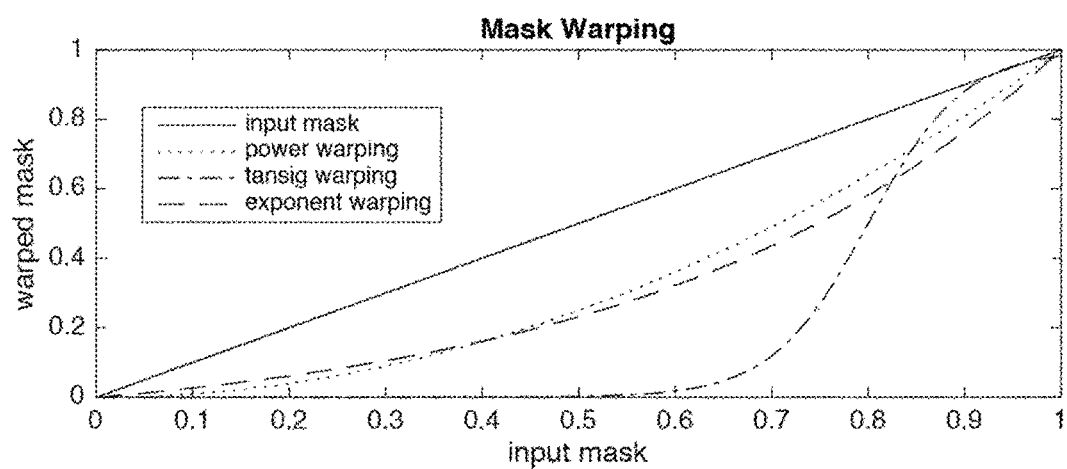
FIG. 4 illustrates a mask warping function used by an audio signal processing device according to an embodiment of the present invention.

In addition, the machine learning model 2000 may classify a frequency bin-specific score acquired in the machine learning model, based on a pre-designated threshold value. Specifically, the machine learning model 2000 may obtain a frequency bin-specific mask value of an input signal. The mask value is obtained for each frequency bin. In addition, the mask value may be a prediction value of a ratio of an audio component to be separated from the input signal. The mask value may have a soft-decision value between 0 and 1. For example, when the mask value of a specific frequency bin at a specific time point is 1, the mask value may indicate that a signal of the corresponding frequency bin is identical to the audio signal component to be separated. When the mask value of a specific frequency bin at a specific time point is 0, the mask value may indicate that a signal of the corresponding frequency bin does not include the audio signal component to be separated. The machine learning model 2000 may separate the audio signal component to be separated, by multiplying the obtained frequency bin-specific mask value and the frequency bin-specific input signal. When the mask value of a specific frequency bin at a specific time point is 0.5, the mask value may indicate that the audio signal component to be separated and the remaining audio signal components are mixed in the corresponding frequency bin with a ratio of 1:1. Accordingly, when the audio signal component to be separated and the remaining audio signal components are mixed analogously, interference may exist in the separated audio signal component. Specifically, the machine learning model 2000 may adjust a space between scores. Specifically, as shown in FIG. 4, mask warping may be applied. For example, the machine learning model 2000 may apply mask warping in the form of an exponential function to a score for each frequency bin. In this case, the exponential function may be as in an equation below, $$f(x) = X^n,$$

wherein n may be determined based on the strength of mask warping. Through the embodiments described above, the machine learning model 2000 can reduce the interference of the separated audio signal.

Figure 5:
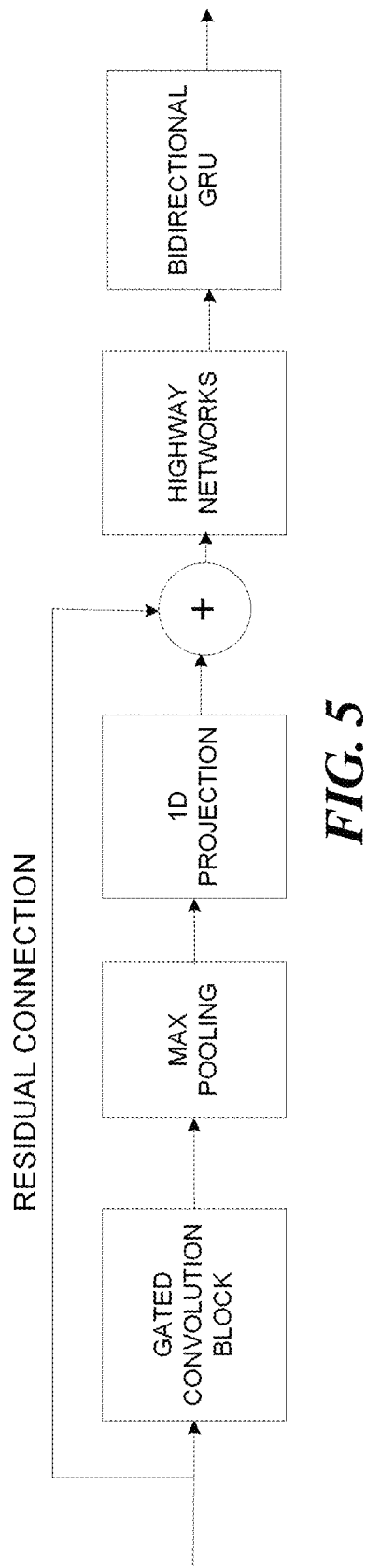
FIG. 5 illustrates gate CBHG included in a machine learning model used by an audio signal processing device according to an embodiment of the present invention.

In addition, the above-described gate CHBG may be configured as shown in FIG. 5.

Now, effects obtained by applying the above-described machine learning model of FIG. 3 and the gate CHBG of FIG. 5 will be described with reference to FIG. 6.

Figure 6:
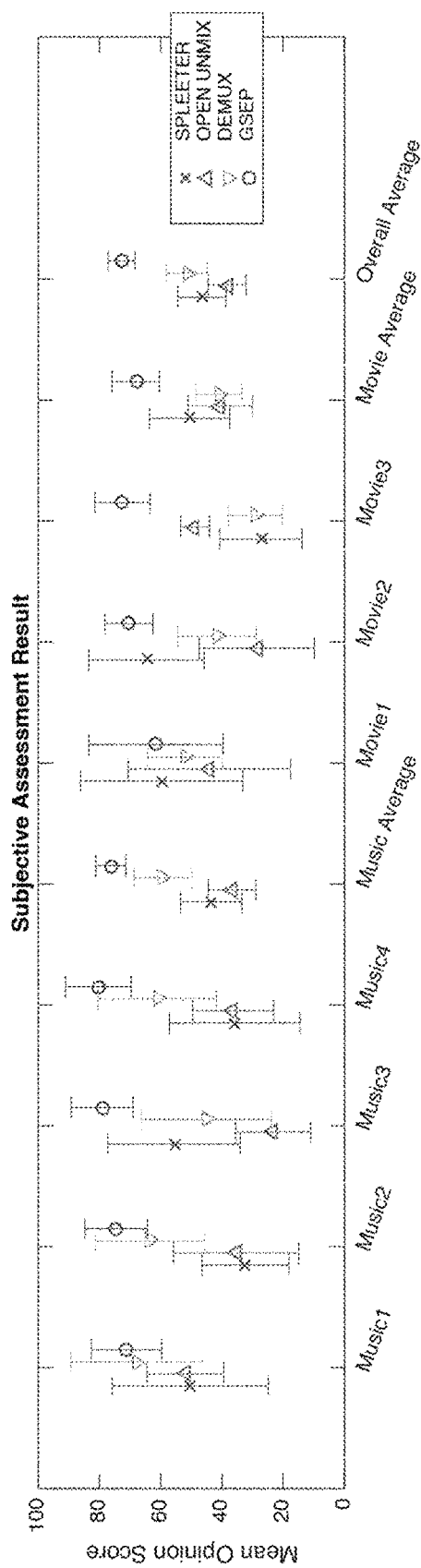
FIG. 6 illustrates a result performance assessment of an audio signal processing device and another audio signal processing device according to an embodiment of the present invention.

FIG. 6 illustrates a result of performance assessment of an audio signal processing device and another audio signal processing device according to an embodiment of the present invention.

The conventional sound source separation method that are widely used may include: "SPLEETER", Romain Hennequin, Anis Khlif, Felix Voituret, Manuel Moussallam, "Spleeter, A fast and state-of-the-art music source separation tool with pre-trained models", 20th International Society for Music Information Retrieval Conference, Delft, Netherlands, 2019; "OPEN UNMIX", Fabian-Robert Stöter, Stefan Uhlich, Antoine Liutkus, and Yuki Mitsufuji, "Open-unmix-a reference implementation for music source separation", Journal of Open Source Software, 2019; and "DEMUCS", Alexandre Défossez, Nicolas Usunier, Léon Bottou, Francis Bach, "Demucs: Deep Extractor for Music Sources with extra unlabeled data remixed" 2019. An audio signal processing method to which the loudness normalization described in FIG. 1 and the machine learning model described in FIGS. 2 to 5 are applied is called "GSEP". To assess the performance of the GSEP, there is a need for comparison with the conventional sound source separation methods.

For performance assessment, the GSEP is trained with MUSDB818 and 3000 songs and speech datasheets. An individual audio segment used to train the machine learning model is generated as below. One voice sound source is randomly selected, and loudness of the selected sound source is adjusted to 0 LUFS. Three non-vocal sound sources are randomly selected, and loudness of each of the three selected sound sources is adjusted to a random value between −12 LUFS and 12 LUFS. By mixing four generated sound sources, an individual audio segment used to train the machine learning model is generated.

In addition, in the performance assessment, assessment is performed for extracting of signal components remaining after excluding a voice, by using sound sources in Table 1. In addition, in the performance assessment, assessment is performed for extracting only a conversation from a movie and a TV show, by using sound sources in Table 2.

TABLE 1

| ID | Title | Scene description |
|----|-------|-------------------|
| 1 | Cardi B | Heavy bass hiphop with male & female vocal |
| 2 | Red Velvet | K-Pop with femide solo & chorus |
| 3 | Damien Rice | Acoustic with male vocal, guitar, and strings |
| 4 | Imagine Dragon | Pop with male vocal & chorus |

TABLE 2

| ID | Title | Scene descriptions |
|----|-------|-------------------|
| 1 | House of Cards | Dialogue, court crowd noise, BGM |
| 2 | Marriage Story | Primary and secondary dialogues, BGM |
| 3 | Sport Event | Caster dialogue, stadium crowd noise, BGM |

As shown in FIG. 6, a result of subjective assessment shows that the GSEP sound source separation performance is higher compared to a case of using the conventional sound source separation method. In addition, a result as shown in Table 3 is obtained in objective performance assessment, and thus, it is also assessed that the GSEP performance is superior to that of the conventional sound source separation.

TABLE 3

| | procesessing time[1] per second [ms] | | |
|---|---|---|---|
| Model | Server[2] | Mobile[3] | Model Size |
| Open-Unmix[6] | 3.82 | 94.60 | 35 MB |
| Demucs | 8.69 | N/A[4] | 2.59 GB |
| Spleeter[6] | 1.81[5] | 23.32[5] | 37 MB |
| GSEP[6] | 1.49 | 39.09 | 96 MB |

[1]Processing time is measured fifty times for a three-minute input signal and averaged among the forty fastest measured time.
[2]Server specification: Intel Xeon Gold 5120, NVDIA V100, Ubuntn 16.04, PyTorch 1.6.
[3]Mobile device specification: Samsung Galaxy 9, Android 9, PyTorch 1.6
[4]The model size of the Demucs is beyond the capacity of the testing mobile device.
[5]Spleeter models on the server and mobile was re-implemented in PyTorch 1.6 by the authors
[6]Open-Unmix, Spleeter, and GSEP was implemented without Wiener filter.

In addition, as shown in Table 4, in operation efficiency assessment, it is also assessed that the GSEP is the most efficient among the sound source separation methods to be assessed.

TABLE 4

| | Vocal | | Accompaniment | |
|---|---|---|---|---|
| Model | SDR | SIR | SDR | SIR |
| MMDenseLSTM + WF[4] | 7.16[1] | 16.49[1] | 13.73[1] | 18.50[1] |
| Demucs | 7.05[2] | 13.94[2] | 13.37[3] | 17.95[3] |
| Open-Unmix + WF[4] | 6.32[2] | 13.33[2] | 12.73[3] | 18.47[3] |
| Spleeter + WF[4] | 6.86[2] | 15.86[2] | 12.70[3] | 18.88[3] |
| GSEP[5] | 6.98 | 15.38 | 13.28 | 17.65 |
| GSEP + WF[5] | 7.24 | 17.62 | 13.30 | 18.98 |

[1]Shown during the SiSEC 2018. [19]
[2]Reported in the papers. [5, 6, 7]
[3]Publicly unavailable and measured using [19] by the Authors.
[4]Wiener filter was used for the MMDenseLSTM, Open-Unmix, and Spleeter models.
[5]The intensity ratio α is 1.4.

Figure 7:
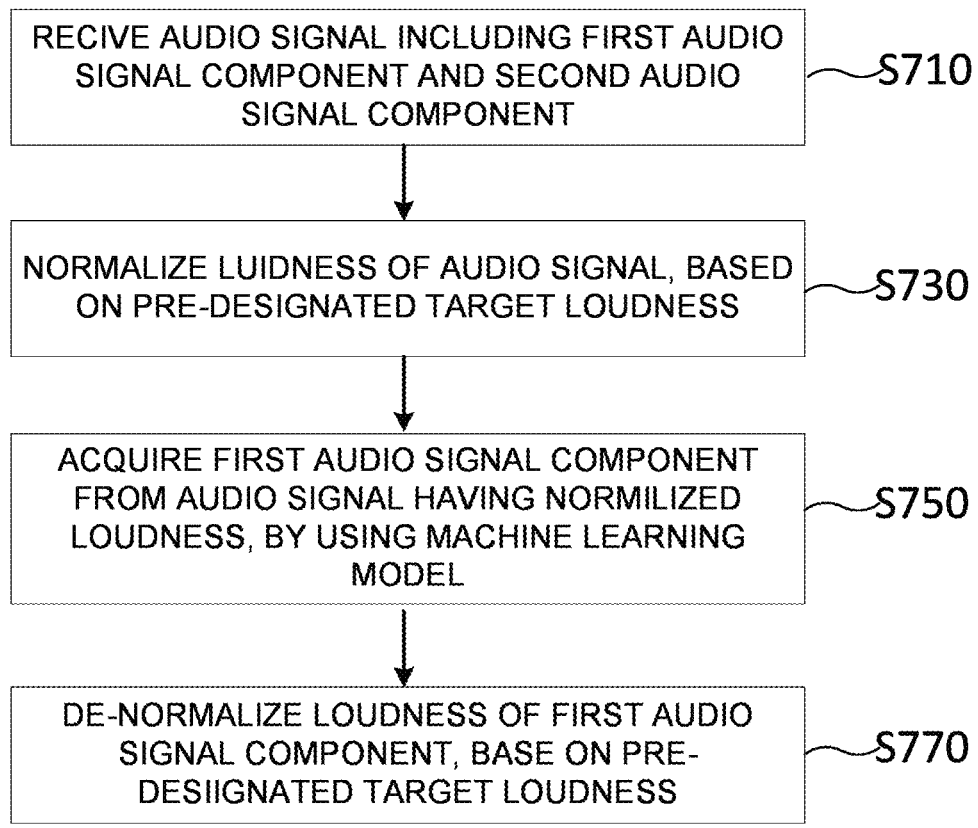
FIG. 7 illustrates an audio signal processing operation according to an embodiment of the present invention.

FIG. 7 illustrates an audio signal processing operation according to an embodiment of the present invention.

An audio signal processing device receives an audio signal including a first audio signal component and a second signal component (operation S710). In this case, at least one of the first audio signal component and the second audio signal component may be an audio signal component corresponding to a voice. In addition, the other may be an audio signal component which does not correspond to a voice.

The audio signal processing device normalizes loudness of the audio signal, based on pre-designated target loudness (operation S730). Specifically, the audio signal processing device may normalize the loudness of the audio signal to the pre-designated target loudness. In this case, the audio signal processing device may normalize the loudness of the audio signal by using loudness distribution information indicating a ratio of a total amount of audio signals to an amount of an audio signal corresponding to each stage among audio signals, at each of multiple stages divided according a scale of the loudness. In addition, the audio signal processing device may normalize the loudness in units of contents included in the audio signal. The audio signal processing device may normalize the loudness of the audio signal according to the embodiment described with reference to FIG. 1.

The audio signal processing device may acquire a first audio signal component from the audio signal having the normalized loudness, by using a machine learning model (operation S750). In this case, the machine learning model may process the audio signal having the normalized loudness in a frequency area. In addition, the machine learning model may include gate logic. Specifically, the machine learning model may be a long short-term memory (LSTM)-based machine learning model including gate logic. In another embodiment, the machine learning model may be a gated recurrent unit (GRU)-based machine learning model. Specifically, the machine learning model may operate according to the embodiment relating to the machine learning model described with reference to FIGS. 2 to 5.

In addition, the audio signal processing device may classify a frequency bin-specific score acquired in the machine learning model, based on a pre-designated threshold value. In this case, the score may indicate the degree of closeness to the first audio signal component. The audio signal processing device may adjust the distribution of scores. Specifically, the audio signal processing device may adjust a space between scores. Specifically, the audio signal processing device may apply the mask warping described with reference to FIG. 5 to a score for each frequency bin.

The audio signal processing device de-normalizes the loudness of the first audio signal component, based on the pre-designated target loudness (operation S770). Specifically, the audio signal processing device may de-normalize the loudness of the audio signal, based on the pre-designated target loudness. Specifically, the audio signal processing device may acquire a gain used for loudness de-normalization, based on the target loudness and the input audio signal. In addition, the audio signal processing device may de-normalize the loudness of the audio signal by using loudness distribution information used for the loudness normalization. The audio signal processing device may de-normalize the loudness of the audio signal according to the embodiments described with reference to FIG. 1.

The above operations of the audio signal processing device may be applied the same when not only processing an audio signal but also training a machine learning model.

Some embodiments may also be implemented in the form of a recoding medium including an instruction executable by a computer, such as a program module executable by computer. A computer-readable medium may be any available medium that can be accessed by a computer, and may include all of a volatile medium, a non-volatile medium, a separable medium, and a non-separable medium. In addition, the computer-readable medium may include a computer storage medium. The computer storage medium may include all of a volatile medium, a non-volatile medium, a separable medium, and a non-separable medium which are implemented by any method or technology for storing information such as a computer-readable instruction, a data structure, a program module, or other data.

Although the present invention has been described above through the specific embodiments, those skilled in the art could make changes and modifications without departing from the spirit and the scope of the present invention. That is, although the embodiments of loudness level correction for an audio signal have been described, the present invention may be equally applied and extended to various multimedia signals including not only an audio signal but also a video signal. Therefore, any derivatives that could be easily inferred by those skilled in the art from the detailed description and the embodiments of the present invention should be construed as falling within the scope of right of the present invention.

What is claimed is:

1. An operation method of an audio signal processing device which operates in at least one process and is configured to process an audio signal comprising a first audio signal component and a second audio signal component, the method comprising:
   receiving the audio signal;
   normalizing loudness of the audio signal, based on a pre-designated target loudness;
   acquiring the first audio signal component from the audio signal having the normalized loudness, by using a machine learning model; and
   de-normalizing loudness of the first audio signal component, based on the pre-designated target loudness.

2. The method of claim 1, wherein at least one of the first audio signal component and the second audio signal component is an audio signal component corresponding to a voice.

3. The method of claim 1, wherein the normalizing of the loudness of the audio signal, based on the pre-designated target loudness, comprises normalizing loudness in units of contents included in the audio signal.

4. The method of claim 1, wherein the machine learning model processes the audio signal having the normalized loudness in a frequency area.

5. The method of claim 1, wherein the normalizing of the loudness of the audio signal, based on the pre-designated target loudness, comprises:
   dividing the audio signal into multiple pre-designated time intervals, dividing loudness values in the multiple pre-designated time intervals into multiple levels, and acquiring loudness of the audio signal by using a loudness value distribution for each of the multiple levels; and
   normalizing the loudness of the audio signal to target loudness.

6. The method of claim 1, wherein the machine learning model comprises gate logic.

7. The method of claim 1, wherein the acquiring of the first audio signal component from the audio signal having the normalized loudness, by using the machine learning model, comprises classifying a frequency bin-specific score acquired from the machine learning model, based on a pre-designated threshold value,
   wherein the score indicates a degree of closeness to the first audio signal component.

8. A method for training a machine learning model which operates in at least one process and is configured to classify a first audio signal component from an audio signal comprising the first audio signal component and a second audio signal acquired from different sources, the method comprising:
   receiving the audio signal;
   normalizing loudness of the audio signal, based on pre-designated target loudness;
   acquiring a first audio signal component from the audio signal having the normalized loudness, by using the machine learning model; and
   restoring the loudness of the first audio signal component, based on the pre-designated target loudness.

9. The method of claim 8, wherein at least one of the first audio signal component and the second audio signal component is an audio signal component corresponding to a voice.

10. The method of claim 8, wherein the normalizing of the loudness of the audio signal, based on the pre-designated target loudness, comprises normalizing loudness in units of contents included in the audio signal.

11. The method of claim 8, wherein the machine learning model processes the audio signal having the normalized loudness in a frequency area.

12. The method of claim 8, wherein the normalizing of the loudness of the audio signal, based on the pre-designated target loudness, comprises:
   dividing the audio signal into multiple pre-designated time intervals, dividing loudness values in the multiple pre-designated time intervals into multiple levels, and acquiring loudness of the audio signal by using a loudness value distribution for each of the multiple levels; and
   normalizing the loudness of the audio signal to target loudness.

13. The method of claim 8, wherein the machine learning model comprises gate logic.

14. The method of claim 8, wherein the acquiring of the first audio signal component from the audio signal having the normalized loudness, by using the machine learning model, comprises classifying a frequency bin-specific score acquired from the machine learning model, based on a pre-designated threshold value,
   wherein the score indicates a degree of closeness to the first audio signal component.

15. An audio signal processing device configured to process an audio signal comprising a first audio signal component and a second audio signal component, the device comprising at least one processor,
   wherein the at least one processor:
   receives the audio signal;
   normalizes loudness of the audio signal, based on a pre-designated target loudness;
   acquires the first audio signal component from the audio signal having the normalized loudness, by using a machine learning model; and
   de-normalizes loudness of the first audio signal component, based on the pre-designated target loudness.

* * * * *